(12) United States Patent
Hiratsuka et al.

(10) Patent No.: US 6,556,527 B1
(45) Date of Patent: Apr. 29, 2003

(54) ELECTRONIC EQUIPMENT UTILIZING PORTABLE STORAGE MEDIUM

(75) Inventors: Yoshiaki Hiratsuka, Kawasaki (JP); Hisashi Yoshinaga, Kawasaki (JP); Masanori Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/539,625

(22) Filed: Mar. 31, 2000

(30) Foreign Application Priority Data

Sep. 1, 1999 (JP) .......................................... 11-247942

(51) Int. Cl.[7] .............................................. G11B 33/02
(52) U.S. Cl. ...................................................... 369/75.1
(58) Field of Search ........................ 369/75.1; 361/683, 361/796, 799, 818

(56) References Cited

U.S. PATENT DOCUMENTS

| | | | | |
|---|---|---|---|---|
| 5,600,509 A | * | 2/1997 | Kawakami ................ | 360/97.02 |
| 5,739,970 A | * | 4/1998 | Kobayashi et al. ............ | 360/75 |
| 5,748,442 A | * | 5/1998 | Toor ............................ | 361/685 |
| 6,088,222 A | * | 7/2000 | Schmitt et al. ............. | 361/686 |
| 6,114,622 A | * | 9/2000 | Draeger .................... | 174/35 R |
| 6,219,323 B1 | * | 4/2001 | Fukatsu et al. ............ | 369/75.1 |
| 6,229,699 B1 | * | 5/2001 | Kerrigan et al. ........ | 174/138 G |
| 6,231,144 B1 | * | 5/2001 | Chen et al. .............. | 312/223.2 |
| 6,274,807 B1 | * | 8/2001 | Pommerenke et al. . | 174/35 GC |
| 6,297,955 B1 | * | 10/2001 | Frank et al. ................. | 361/683 |
| 6,344,978 B1 | * | 2/2002 | Komiya .................. | 174/35 MS |
| 6,373,697 B1 | * | 4/2002 | Lajara et al. ................ | 165/122 |

FOREIGN PATENT DOCUMENTS

JP          8-293690          11/1996

* cited by examiner

Primary Examiner—David L. Ometz
Assistant Examiner—Angel Castro
(74) Attorney, Agent, or Firm—Armstrong, Westerman & Hattori, LLP

(57) ABSTRACT

An electronic apparatus is adapted to be used with a portable storage medium installed therein. The apparatus includes a mounting portion in which a unit for driving a portable storage medium is mounted. The mounting portion is constituted by a metal plate. When a storage medium is installed, an opening of the metal plate into which said storage medium is inserted is electrically connected between an upper portion and a lower portion thereof, so that the metal plate does not resonate with radio waves generated outside of the apparatus.

4 Claims, 5 Drawing Sheets

ELECTRONIC EQUIPMENT UTILIZING PORTABLE STORAGE MEDIUM

BACKGROUND OF THE INVENTION.

1. Field of the Invention

The present invention relates to an electronic apparatus on which a portable storage medium can be detachably mounted and which is adapted to be used with the portable storage medium being mounted, and more particularly to an electronic apparatus utilizing a portable storage medium for preventing resonance generated by the configuration or construction of a metal plate or the like on an insertion face of a unit into which a portable storage medium, such as a magnetic disk, an optical disk or a magneto-optical disk, is inserted for use when radio waves are generated outside the unit or equipment in which the unit is installed to thereby prevent, in turn, a malfunction of the unit.

In recent years, portable electronic equipment and portable radio equipment have become common, and there has been a growing tendency that both are used, simultaneously, in a closed environment. As a result of this, there can occur a case where a strong electro-magnetic field is applied from the radio equipment to the electronic equipment in which a portable storage medium is installed. When this happens, the peripheral portion of the equipment which surrounds the installed portable storage medium may resonate, and the level of electro-magnetic field is increased,.whereby the read circuit or the like of the electronic equipment is caused to malfunction.

As countermeasures against the malfunction described above, there has been a demand for an increase in resistance to electromagnetic fields by configuring and/or constructing the metal plate on the insertion face where the portable storage medium is inserted or a metal plate at the mounting portion of the unit such that they do not resonate even when affected by radio waves or by modifying the distribution of electro-magnetic field inside the unit.

2. Description of the Related Art

Conventionally, since no countermeasures against electro-magnetic fields have been taken in considering the size of a metal plate constituting the insertion face for a portable storage medium, there has been a problem that the metal plate resonates with radio waves generated outside, whereby the electro-magnetic field of the radio waves is increased to thereby cause the read circuit of a unit using a portable storage medium to malfunction.

As an example, a theoretical case will be described in which resonance occurs. Resonance by radio waves is generated when the length of a conductor or the size of frontage becomes a half the wave lenght ($\lambda$) of the radio waves or a multiple of an integer number of the wave lenght. For example assuming that size of the portable storage medium insertion face is 1×10 cm and that the frequency (f) of an radio wave is 1.5 GHz, then the wave length of the electronic radio wave is obtained from the following representation:

$$\text{Wave length } \lambda(m) = C/f \tag{1}$$

Where,

C is the velocity of light, $3 \times 10^8$ (m/s)

f is frequency (Hz)

and if the actual numerals are substituted for those in the representation (1), $$\text{Wave length } \lambda = 3 \times 10^8 / 1.5 \times 10^9 = 0.2 \text{ m(20 cm)} \tag{2}$$

Therefore, one half the wave length $\lambda$ is 10 cm, and since this coincides with the longitudinal size of the portable storage medium insertion face in the conventional apparatus, resonance may be generated to cause a malfunction of the apparatus.

As is described above, conventionally, there was a risk that resonance is generated by the configuration or construction of the metal plate or the like on the portable storage medium insertion face, whereby the electro-magnetic field strength of the radio wave is increased, resulting in a malfunction of the unit using the portable storage medium.

SUMMARY OF THE INVENTION

With a view to solving the aforesaid problem, an object of the present invention is to provide an electronic apparatus utilizing a portable storage medium which has is constructed to absorb radio waves and improving its resistance, a construction for improving the yield strength for accommodating a unit or a construction for configuring a metal plate or the like on a portable storage medium insertion surface such that no resonance is generated.

With a view to attaining the aforesaid object, according to the present invention, there is provided an electronic apparatus, adapted to be used with a portable storage medium being installed therein, utilizing a portable storage medium characterized in that a metal plate or the like on a portable storage medium insertion face is configured or constructed such that the metal plate or the like does not resonate with radio waves generated outside the apparatus.

In this case, the size of the metal plate or the like on the portable storage medium insertion face is selected such that the size does not have a $\frac{1}{2}\lambda$, $\frac{1}{4}\lambda$, ... relation or a multiple of an integer number relation to the wave length($\lambda$) of the radio waves.

In addition, according to the present invention, there is provided in an electronic apparatus in which a portable storage medium is removably installed, and which is adapted to be used with the portable storage medium being installed therein, utilizing a portable-storage medium characterized by a construction in which a mounting portion where a unit for driving a portable storage medium is mounted is constituted by a metal plate and in which, when a storage medium is installed, an opening in the metal plate into which the storage medium is inserted is electrically connected between an upper portion and a lower portion thereof, so that the metal plate does not resonate with radio waves generated outside.

In this case, flexible flaps are provided at the upper and lower portions of the opening in the metal plate so that the flaps and the metal plate are brought into electrical contact with each other.

In addition, according to the present invention, there is provided, in an electronic apparatus adapted to be used with a portable storage medium being installed therein, an apparatus for utilizing a portable storage medium characterized by a construction in which a mounting portion where a unit for driving a portable storage medium is mounted is constituted by a metal plate, and in which upper and lower portions of a rearward metal plate are connected to each other and are situated on an opposite side to the side where the storage medium is inserted, so that the metal plate does not resonate with radio waves generated outside.

DETAILED DESCRIPTION OF THE EMBODIMENTS

Referring to the accompanying drawings, embodiments of the present invention will be described below.

Figure 1:
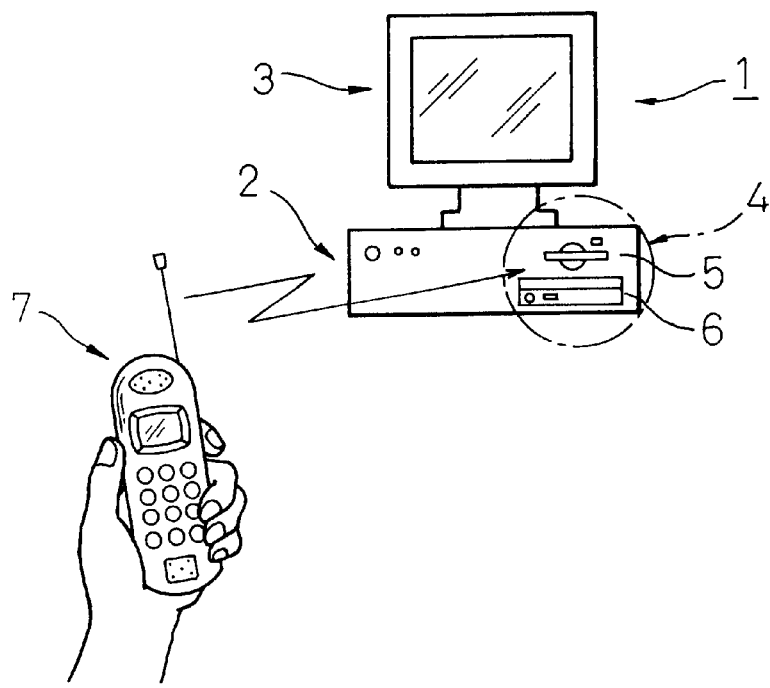
FIG. 1 shows a desktop type computer as an electronic equipment and a portable telephone as a portable radio equipment.

FIG. 1 shows a desktop type computer as electronic equipment and a portable telephone as a portable radio equipment. As shown in the drawings, in recent years, there is a growing tendency that both are simultaneously used in a closed environment. As is well known, the desktop type computer 1 comprises an apparatus main body 1 on a lower side thereof and a display 3 adapted to be placed on the apparatus main body. Provided on a right-hand side of a front side of the apparatus main body are a portable storage medium insertion portion 4 or an insertion portion 5 for a floppy disk (FD) and an insertion portion for a compact disk (CD), which are disposed in parallel with each other in a vertical direction. Although there is a growing tendency for a portable telephone 7 to be used at apposition close to the computer 1, as described above, the relationship between the wave length ($\lambda$) of an radio wave and the configuration or construction of the medium insertion portion is important.

Figure 2:
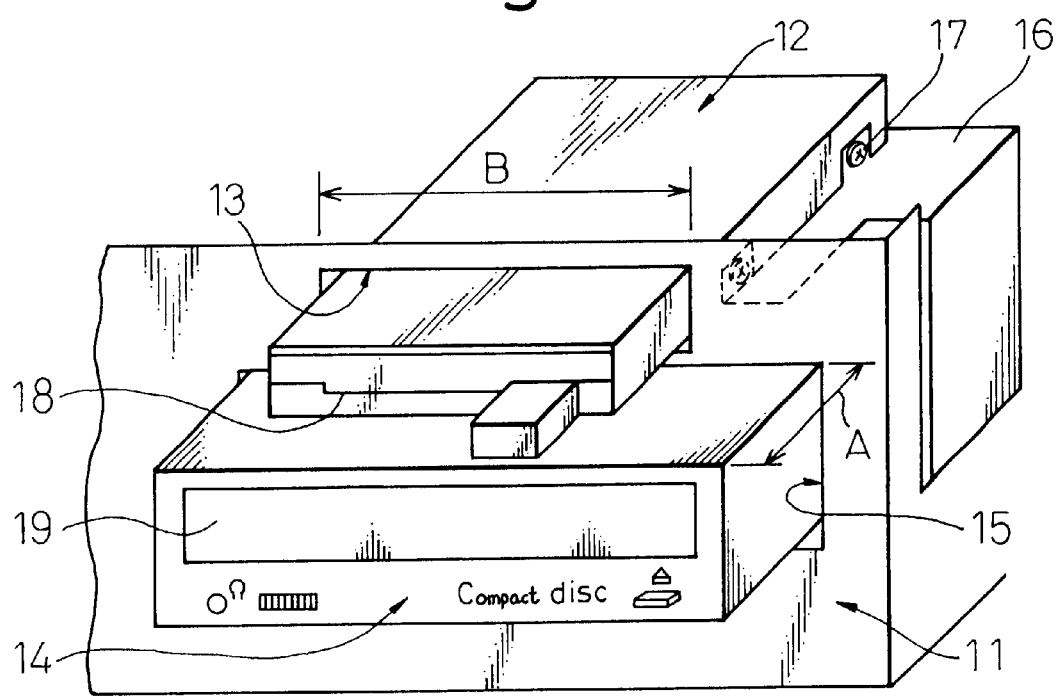
FIG. 2 shows a part of the electronic equipment indicated by A in FIG. 1 and a portable storage medium insertion portion with a front decorative cover (not shown) removed.

FIG. 2 shows a part of the electronic equipment indicated by reference numeral 4 in FIG. 1 and a portable storage medium insertion portion with a front decorative cover (not shown) removed. Formed in a front side of an apparatus box 11 formed of sheet metal are a rectangular hole for inserting thereinto a floppy disk device 12 and a rectangular hole 15 for inserting thereinto a compact disk device 14 in such a manner as to be disposed in parallel in a vertical direction. The floppy disk device 12 and the compact disk device 14 protrude forward from the respective rectangular holes 13, 15 by a distance equal to the thickness A of a front decorative cover (not shown). The floppy disk device 12 is fixed with a screw 17 to a mounting portion 16 formed of sheet metal which is provided in the interior of the apparatus box 11 for fixing a floppy disk. Reference numeral 18 denotes an insertion port for a floppy disk (not shown) and reference numeral 19 denotes a loading portion for a compact disk (not shown).

The size of the rectangular hole 13 for insertion thereinto of the floppy disk device 12 is determined to such an extent that the floppy disk device 12 just fits therein, and therefore the horizontal length B of the opening of the rectangular hole 13 is about 10 cm. This is, as described above, just one half the wave length (20 cm) of the frequency the portable telephone 7 uses, and the horizontal length is the size which resonates with this radio wave. On the other hand, the horizontal length of the frontage of the rectangular hole 15 for insertion thereinto of the compact disk device 14 is longer than the horizontal length of the frontage of the rectangular hole 13 for insertion thereinto of the floppy disk device 12, and the horizontal length of the rectangular hole 15 does not become ½ or ¼ the wave length (20 cm) of the frequency the portable telephone uses, whereby there is no risk of resonance being generated.

Figure 3:
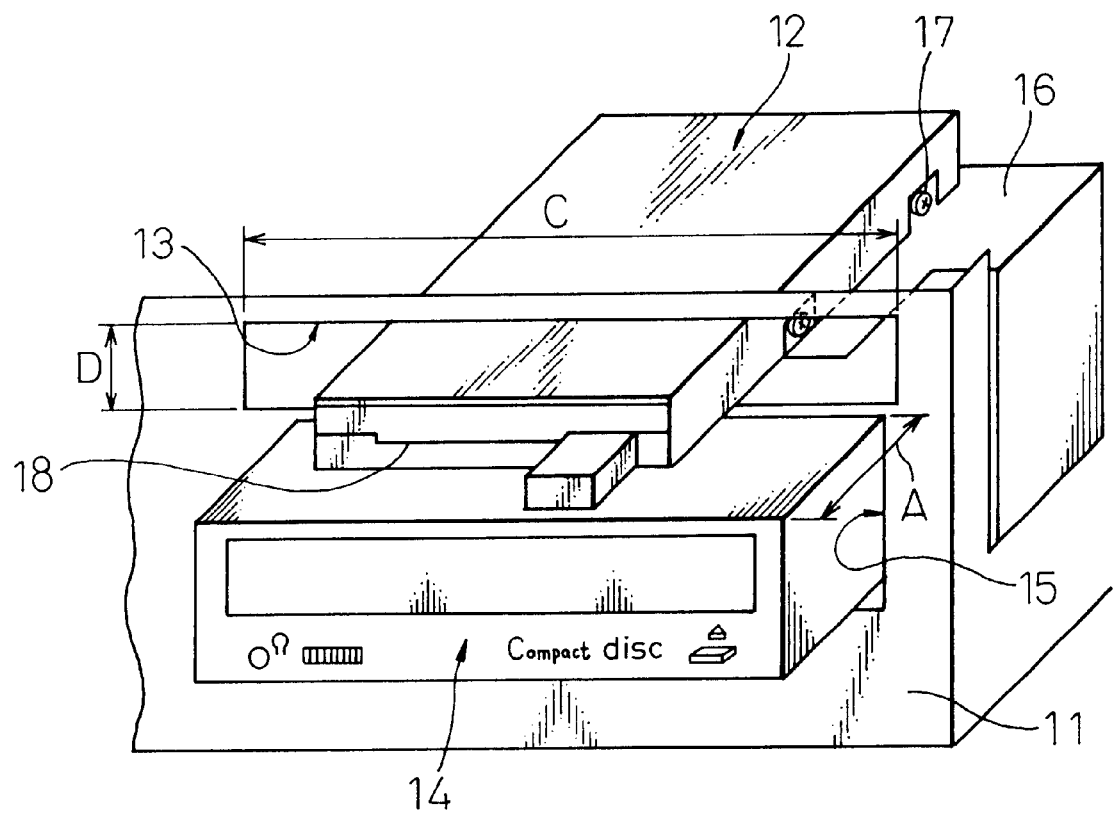
FIG. 3 is a perspective view of an insertion portion of a storage medium according to a first embodiment of the invention.

FIG. 3 shows a perspective view of an insertion portion, for a storage medium, of electronic equipment according to a first embodiment of the present invention, in which the horizontal size C of the front of the rectangular hole 13 for insertion thereinto of the floppy disk device is determined so as to be larger than the size B shown in FIG. 2 so that the size does not coincide with ½ or ¼ the wave length (20 cm) of the frequency that the portable telephone uses. It is identical to that shown in FIG. 2 in that the floppy disk device 12 is fixed with the screw 17 to the mounting portion 16 formed of sheet metal which is provided in the interior of the apparatus box for fixing the floppy disk device. In addition, the vertical size of the frontage of the rectangular hole 13 is not in direct relation to the frequency that the portable telephone uses, and therefore, it may be the same as the vertical size of the rectangular hole shown in FIG. 2.

Figure 4:
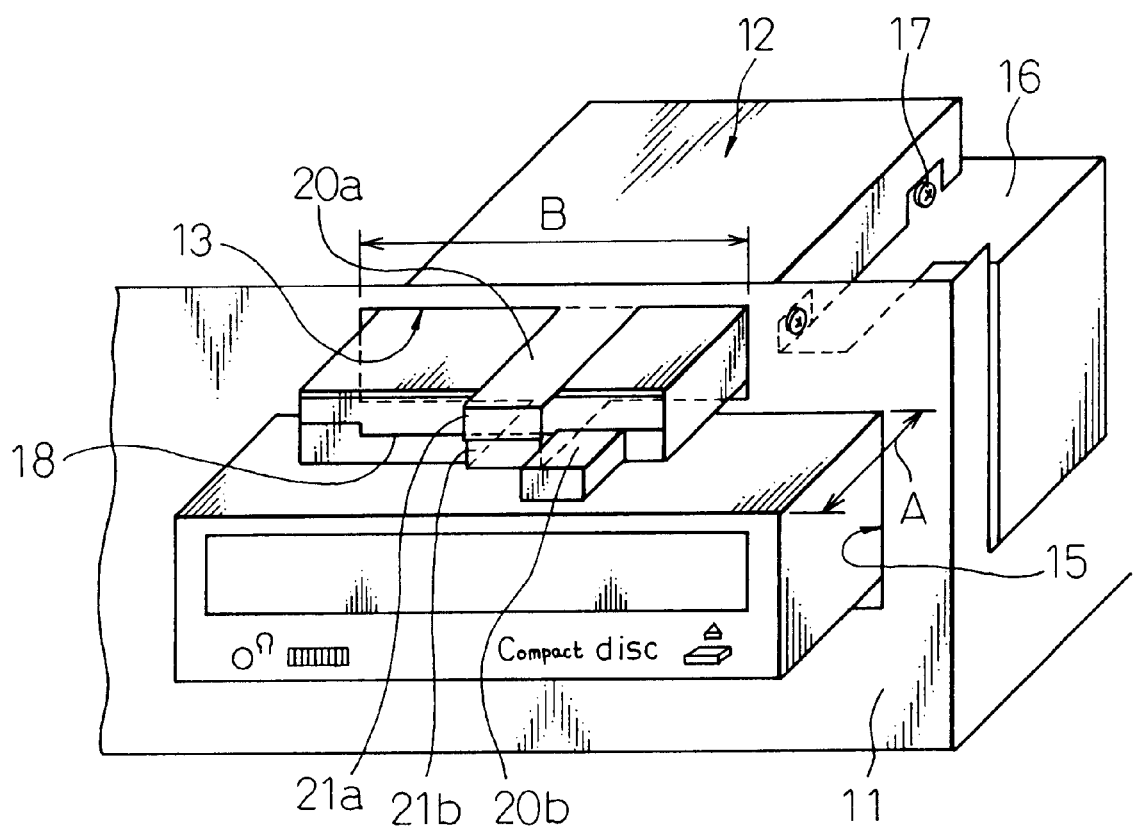
FIG. 4 is a perspective view of an insertion portion of a storage medium according to a second embodiment of the invention.

FIG. 4 shows a perspective view of an insertion portion of a storage medium in electronic equipment according to a second embodiment of the invention, and the size of the rectangular hole 13 for insertion of the floppy disk device 12 is determined to such an extent that the floppy disk device 12 just fits therein and the horizontal length of the frontage of the rectangular hole 13 is about 10 cm. However, in this embodiment, at a front region of the apparatus box 11, sheet metal portions extend forward from upper and lower central portions of the floppy disk device insertion rectangular hole 13 to a portion just in the vicinity of the medium insertion portion of the floppy disk device, and flaps 21a, 21b formed of a soft material, such as a resin (for example, polyester film or the like) are attached to the distal ends of the extending-portions 20a, 20b. These flaps 21a, 21b are extended to such antextent that they approach each other, so that the extending flaps can close the insertion portion for a medium for the front side of the floppy disk device 12 insertion portion. These flaps 21a, 21b are constructed so as to be deflected in a direction in which a floppy disk (not shown) is inserted, and a conductive metallic plating is coated on the surface of the resin through metallization so as to establish an electric communication with the sheet metal portion of the apparatus box 11.

Consequently, when the frontal decorative panel (not shown) of the computer is mounted, there is provided a state in which the distal ends of the flaps 21a, 21b protrude to a portion in the vicinity of the panel. Then, a floppy disk is inserted into the insertion hole 18 of the floppy disc device 12 through between the upper and lower flaps 21a, 21b. When this happens, the upper and lower flaps 21a, 21b deflect in the direction in which the floppy disk is inserted, and when the insertion of the floppy disk is completed, these upper and lower flaps 21a, 21b come into contact with each other whereby, even if the horizontal size of the frontage of the rectangular hole 13 is B, since the intermediate portion is short circuited, it does not resonate with electro-magnetic waves from the outside such as from a portable telephone, whereby the shielding effect can be improved.

Figure 5:
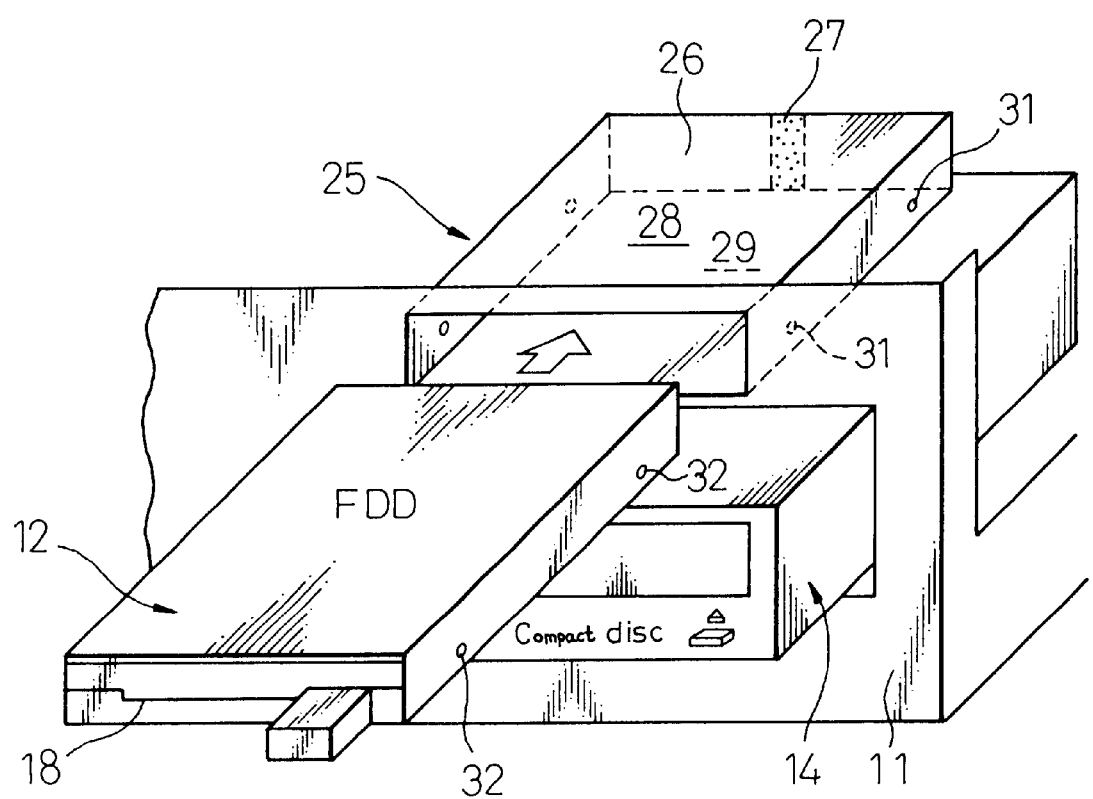
FIG. 5 is a perspective view of an insertion portion of a storage medium according to a third embodiment of the invention.
Figure 6:
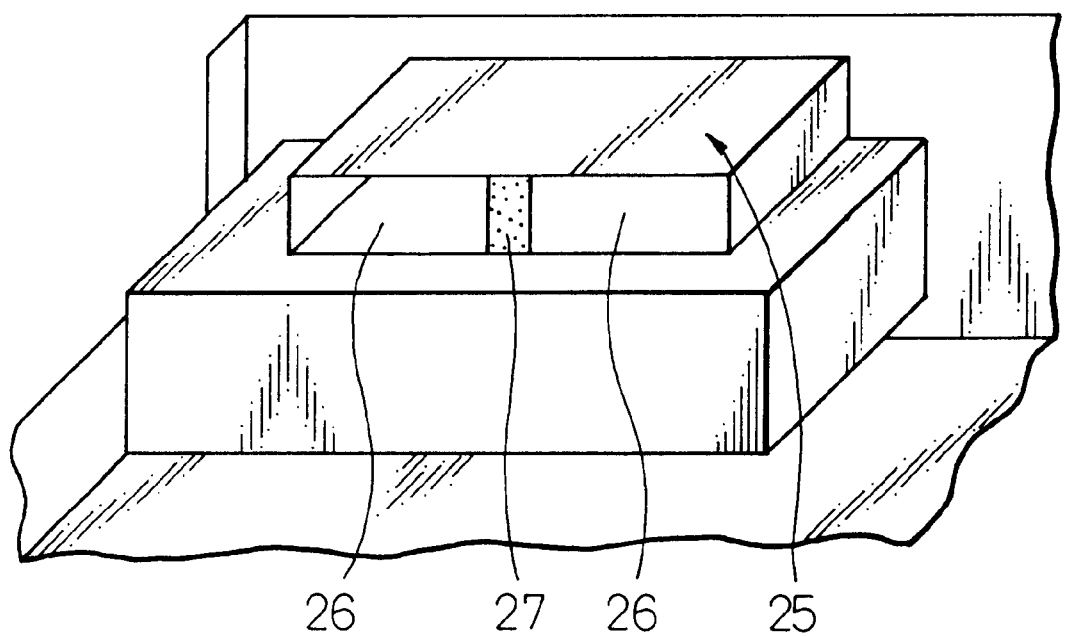
FIG. 6 is a drawing of the third embodiment of the present invention seen from the rear of the unit.

FIG. 5 is a perspective view of an insertion portion of a storage medium in electronic equipment according to a third embodiment of the invention as viewed from the front, and FIG. 6 is a schematic perspective view showing a drive portion of the same embodiment as viewed from the rear. In this embodiment, an opening 26 is formed in each side of a rear portion of, for example, a mounting portion 25 formed of a conductive metal, such as a sheet metal, for accommodating and fixing the floppy disk device 12, and an upper portion 28 and a lower portion 29 are coupled together at a central portion 27, whereby radio waves resonating in the opening portion of the floppy disk insertion portion 18 can be moved rearward. Consequently, the resonance can be suppressed by virtue of the existence of the central connecting portion 27 which mechanically and electrically connects between the upper portion 28 and the lower portion 29 of the mounting portion 25. In addition, it is identical to the previous embodiment in that the floppy disk device 12 is fixed with a screw (not shown) making use of a screw fastening hole 31 formed in the mounting portion 25 and a tapped hole 32 formed in the floppy disk device.

What is claimed is:

1. In an electronic apparatus adapted to be used with a portable storage medium installed therein, characterized by a construction in which a mounting portion where a unit for driving the portable storage medium is mounted is constituted by a metal plate having upper and lower metal portions thereof and a rearward portion which is situated on an opposite side to the side where said storage medium is inserted, in which the rearward portion is constituted by an opening and a rearward metal plate, and in which upper and lower portions of a rearward metal plate are connected to each other and are situated on an opposite side to the side where said storage medium is inserted, so that said metal plate does not resonate with radio waves generated outside of said apparatus; wherein the size of said metal plate on said portable storage medium insertion face is selected in such a manner that said size does not have a $\frac{1}{2}\lambda$, $\frac{1}{4}\lambda$, . . . relation or a multiple of an integer numeral relation to a wave length ($\lambda$) if said radio waves.

2. In an electronic apparatus adapted to be used with a portable storage medium installed therein, characterized in that a metal plate on a portable storage medium insertion face is configured or constructed such that said metal plate does not resonate with radio waves generated outside of said apparatus; and wherein a mounting portion where a unit for driving the portable storage medium is mounted is constituted by a metal plate and in which, when the storage medium is installed, an opening in said metal plate into which said storage medium is inserted is electrically connected between an upper portion and a lower portion thereof, so that said metal plate does not resonate with radio waves generated outside of said apparatus and wherein the size of said metal plate on said portable storage medium insertion face is selected in such a manner that said size does not have a $\frac{1}{2}\lambda$, $\frac{1}{4}\lambda$, . . . relation or a multiple of an integer numeral relation to a wave length ($\lambda$) if said radio waves.

3. An apparatus as set forth in claim 2, wherein flexible flaps are provided at said upper and lower portions of said opening in said metal plate so that said flaps and said metal plate are brought into electrical contact with each other.

4. In an electronic apparatus adapted to be used with a portable storage medium installed therein, characterized in that a metal plate on a portable storage medium insertion face is configured or constructed such that said metal plate does not resonate with radio waves generated outside of said apparatus;

wherein a construction in which a mounting portion where a unit for driving the portable storage medium is mounted is constituted by a metal plate, and in which upper and lower portions of a rearward metal plate are connected to each other and are situated on an opposite side to the side where said storage medium is inserted, so that said metal plate does not resonate with radio waves generated outside of said apparatus; and wherein the size of said metal plate on said portable storage medium insertion face is selected in such a manner that said size does not have a $\frac{1}{2}\lambda$, $\frac{1}{4}\lambda$, . . . relation or a multiple of an integer numeral relation to a wave length ($\lambda$) if said radio waves.

* * * * *